G. E. MALIN.
TRACTOR CULTIVATOR.
APPLICATION FILED AUG. 24, 1918.
1,347,818.
Patented July 27, 1920.
4 SHEETS—SHEET 1.
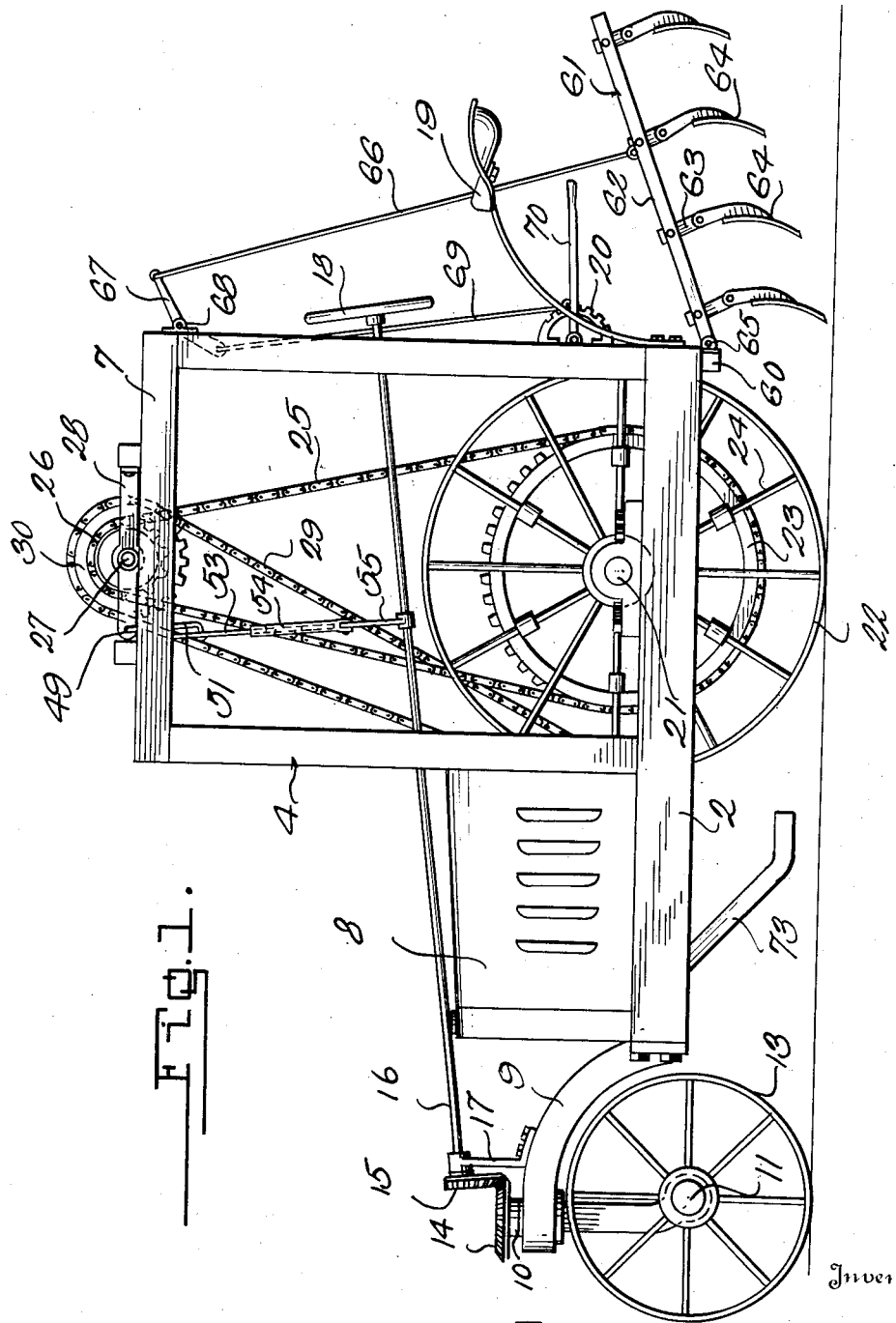
Inventor
George E. Malin
By Lancaster and Allwine
Attorneys

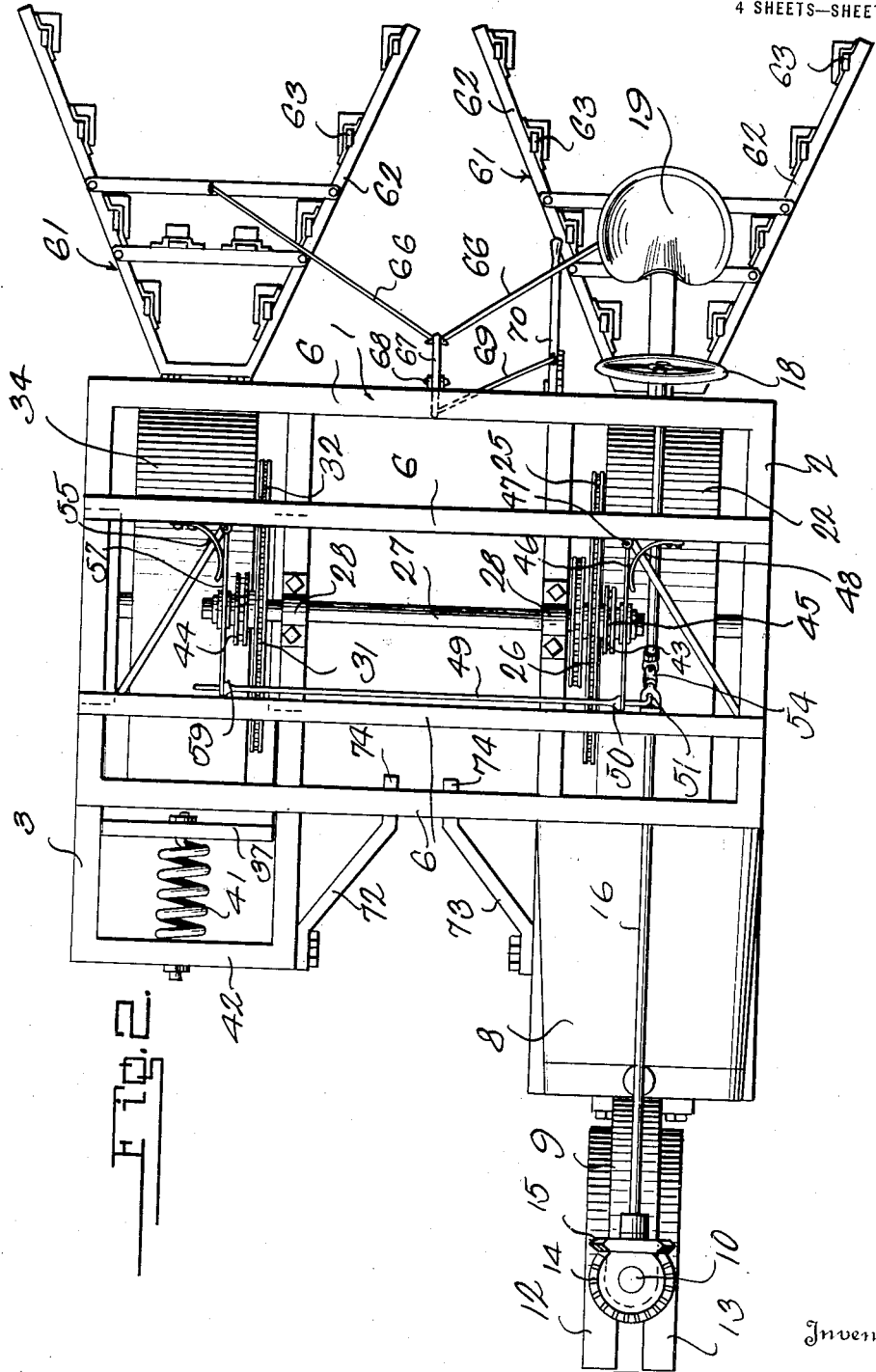

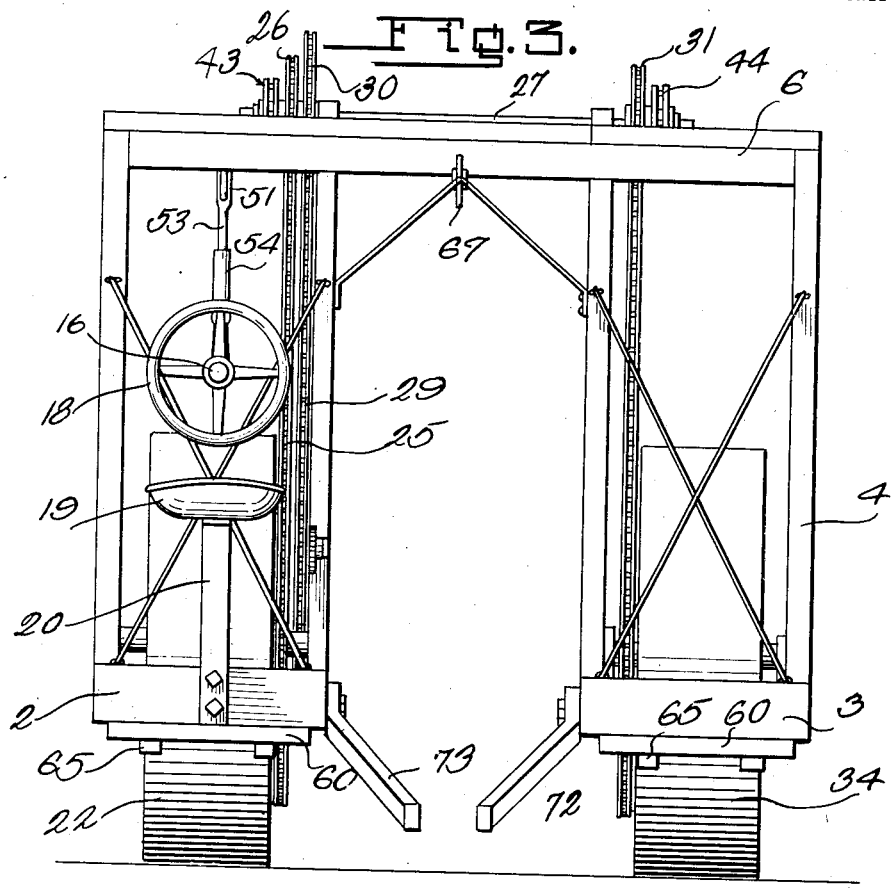
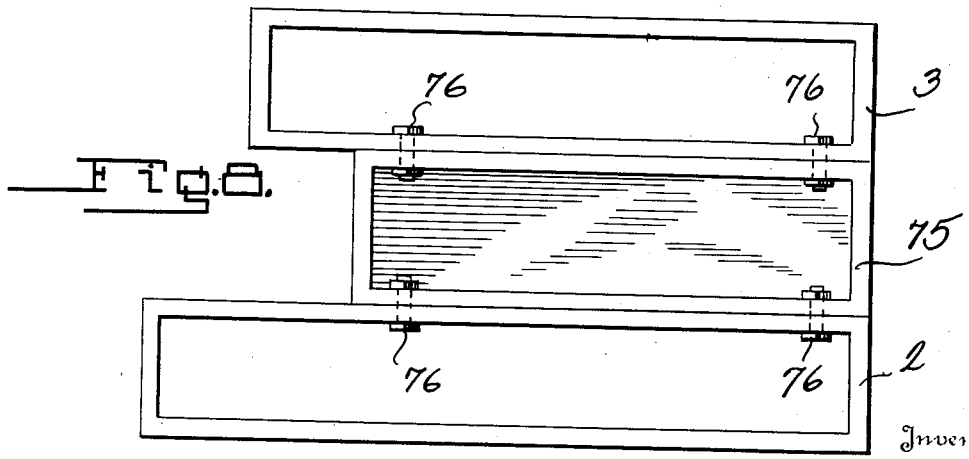

G. E. MALIN.
TRACTOR CULTIVATOR.
APPLICATION FILED AUG. 24, 1918.
1,347,818.
Patented July 27, 1920.
4 SHEETS—SHEET 4.
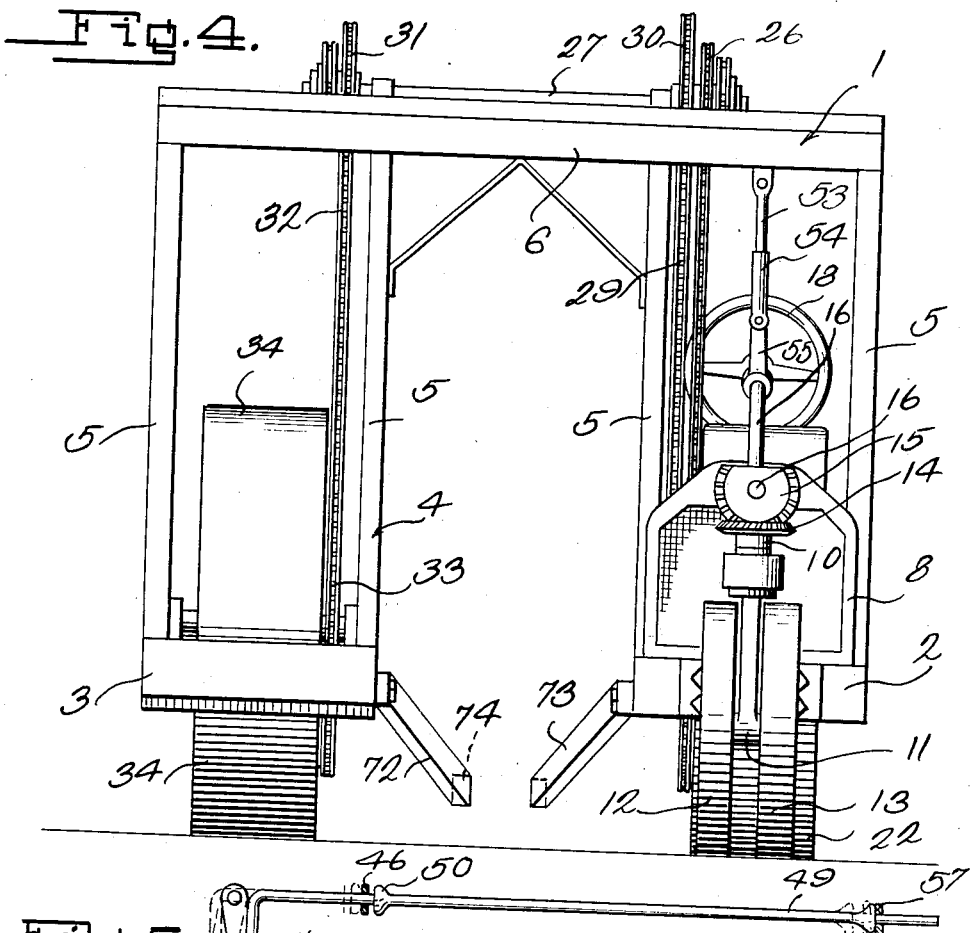
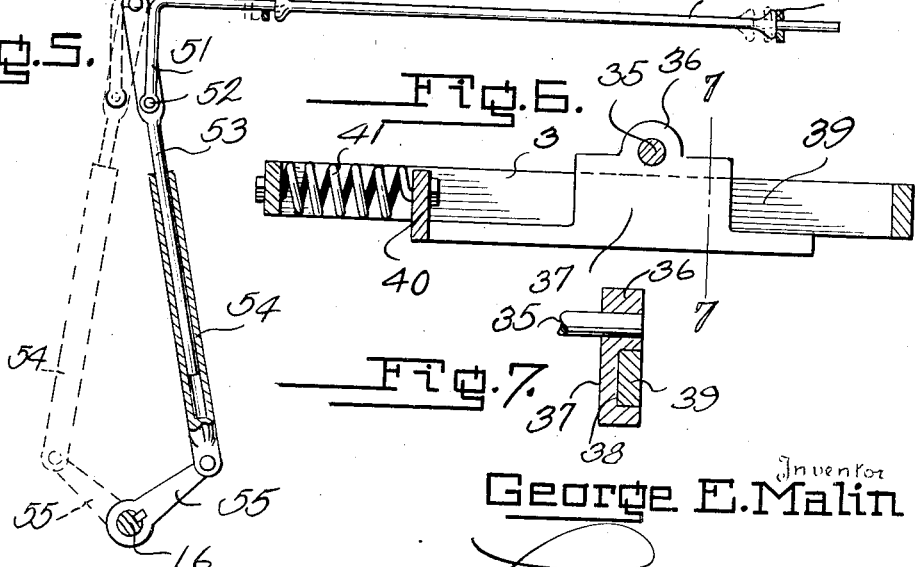
George E. Malin, Inventor

UNITED STATES PATENT OFFICE.

GEORGE E. MALIN, OF PAINESVILLE, OHIO.

TRACTOR-CULTIVATOR.

1,347,818.  Specification of Letters Patent.  Patented July 27, 1920.

Application filed August 24, 1918. Serial No. 251,296.

*To all whom it may concern:*

Be it known that I, GEORGE E. MALIN, a citizen of the United States, and a resident of Painesville, in the county of Lake and State of Ohio, have invented certain new and useful Improvements in Tractor-Cultivators, of which the following is a specification.

This invention relates to a motor or tractor cultivator, and an object of the invention is to provide a device of this nature, for use in cultivation of corn, cotton or analogous crop, wherein the tractor cultivator may be employed for cultivating the corn or analogous crop, throughout its entire growth or all that is necessary, by the provision of a novel form of frame and drive mechanism for the tractor structure, which will permit it to pass over corn of relatively great height.

Another object of this invention is to provide a tractor cultivator as specified, which may be turned in a relatively small space, one of its traction wheels acting as a pivot during turning movement, and also to provide means including clutch mechanism, which means is connected to the steering post of the tractor, so that when the tractor is steered in either direction, the clutch, which controls the transmission of the power to the respective tractor wheel, when the tractor is turning, will be operated for preventing the transmission of power to said wheel, allowing it to remain stationary and act as a pivot.

A further object of this invention is to provide, in a device as specified, a pair of spaced frames, which carry the traction wheels, one of which frames is yieldably connected, to the main supporting frame of the tractor, to allow the load to be supported thereby, and relieve the main supporting frame of strain.

Other objects of the invention will appear in the following detailed description, taken in connection with the accompanying drawings, forming a part of this specification, and in which drawings:

Figure 1 is a side elevation of the improved tractor cultivator.

Fig. 2 is a top plan of the device.

Fig. 3 is a rear elevation of the tractor cultivator.

Fig. 4 is a front elevation of the tractor cultivator.

Fig. 5 is a detail view partially in section of the clutch operating mechanism.

Fig. 6 is a fragmentary sectional view through a part of the frame structure, showing the mounting of the yieldable frame.

Fig. 7 is a section on the line 7—7 of Fig. 6.

Fig. 8 is a plan view of the frame when connected for use as a tractor.

Referring more particularly to the drawings, 1 generically indicates the supporting frame of the tractor structure, which supporting frame comprises side frames 2 and 3, and a connecting frame 4. The connecting frame 4 comprises a plurality of standards 5 which extend upwardly from the frames 2 and 3, the innermost standard being spaced sufficient distance to permit their passage one upon each side of a row of growing corn or cotton, without striking or interfering with the said agricultural product. The upper ends of the standards 5 are connected by suitable cross rails 6 and end rails 7 attached, in any suitable manner.

The side frame 2, is longer, than the frame 3, projecting forwardly beyond the forward end of the frame 3. This side frame 2 supports the operating mechanism, which may be an ordinary gasolene motor, and which is inclosed in the hood or cowl 8 shown in Figs. 1 and 2 of the drawings. The frame 2 also has a forwardly extending bracket 9 carried thereby, the forward end of which rotatably supports a standard 10.

The standard 10 has transversely extending spindles 11 formed upon its lower end, upon which the steering wheel or guide wheels 12 and 13 of the tractor are rotatably mounted. The standard 10, has a beveled gear 14 mounted upon its upper ends which meshes with a segmental beveled gear 15. The segmental beveled gear 15 is mounted upon the forward end of the steering rod or post 16. The steering rod or post 16 is rotatably supported by suitable bearings 17 and it extends rearwardly over the frame 2, having the hand wheel 18 which is mounted upon its rear end positioned in close proximity to the seat 19, so that it may be conveniently reached and operated by a person seated upon the seat. The seat 19 is the usual type of seat employed in agricultural implements, and is supported by a spring standard 20 which is attached to the rear end of the frame 2.

An axle 21 is rotatably supported by the frame 2, and it carries a drive or traction wheel 22. This drive or traction wheel 22 has a sprocket 23 attached to the spoke 24 thereof in any suitable manner. A sprocket chain 25 travels about the sprocket 23, and about a sprocket 26. The sprocket 26 is carried by a shaft 27, which shaft is supported by suitable bearings 28 carried by the super-structure, or the upstanding portion 4 of the frame structure 1 of the tractor. The shaft 27 is operatively connected to the prime mover of the engine through the medium of a sprocket chain 29 which travels about a sprocket 30 carried by the shaft 27. The shaft 27 extends across the upper portion of the upstanding portion 4 of the supporting frame 1 and it has a sprocket 31 mounted thereon about which a sprocket chain 32 travels. This sprocket chain 32 also travels about a suitable sprocket 33 carried by the traction wheel 34. The traction wheel 34 is rotatably mounted upon its axle 35 and this axle is in turn supported by suitable bearings 36. The bearings 36 are formed upon a supplemental or yieldably mounted frame 37 which is provided with recesses 38 receiving therein the side rails 39 of the frame 3 to guide and permit sliding movement of the frame 37 with respect to the frame 2. The forward front end 40 of the sliding or yieldably mounted frame 37 has a spiral spring 41 connected thereto which is also connected to the front cross rail 42 of the frame 3 and permits yieldable mounting of the traction wheel 34, so that the strain of the operation of this wheel will be absorbed prior to its transmission to the supporting frame 3, thereby relieving this frame of the strain of the tractive action of the wheel 34.

The sprockets 31 and 26 are loosely mounted upon the shaft 27 and they have clutch mechanisms 43 and 44 associated therewith respectively. The clutch mechanism 43, includes the clutch member 45 for engagement with the sprocket, which clutch member has a rod 46 connected thereto. This rod 46 is pivotally connected as shown at 47 to one of the cross braces 6 of the super-supporting frame 4 and the clutch member 45 is normally held in operative engagement with the sprocket by a spring 48 which engages against the rod 46. The rod 46 has its free end mounted over a rod 49 and normally engaging an abutment 50 which is formed upon this rod. The rod 49 has its left hand end bent downwardly as shown at 51 and pivotally connected as at 52 to a pivotally supported rod 53. The rod 53 is telescopically mounted in a suitable sleeve member 54. The lower end of the sleeve member 54 is connected to a crank arm 55 which is keyed to the steering rod 16. The clutch member 44 is operated by a pivoted rod 57 which is pivotally connected to the cross brace 6 and which has a spring 55 engaging against the same for holding the clutch member 44 in operative engagement with the sprocket 31. The rod 57 also has its free end mounted about the rod 49 and provided for engagement against an abutment 59 carried by this rod; thus when the steering post 16 is rotated in one direction, it will shift the clutches for moving either the clutch 43 or 44 out of engagement with its respective sprocket. In case it is desired to turn the tractor toward the traction wheel 34; the steering post 16 is rotated, through the medium of the hand wheel 18 to properly guide the steering wheels 12 and 13 and this movement of the steering wheels will shift the rod 57, for moving the clutch 44 out of engagement with the sprocket 31 to permit the tractor to turn upon the traction wheel 34 as a pivot, thus enabling it to make a relatively short turn.

The frames 2 and 3 have draw bars 60 to which the earth-working tools indicated at 61 are connected. In the drawings, these tools are shown as cultivator standards 62, carrying the shank 63 upon which the cultivating shovels 64 are mounted. The standards 62 are pivotally connected as shown at 65 to the draw bars 60 and they have rods or flexible members 66 connected thereto intermediate their ends. The members 66 extend upwardly and are connected to the outer end of a lever 67 which is pivotally supported as shown at 68. The lever 67 is connected, by means of a rod or flexible member 69 to an operating lever 70 which is positioned for convenient access thereto by the person riding upon the seat 9. Through the manipulation of the lever 70, the earth-working tools 61 may be raised or lowered either out of or into operative positions, or the depth of insertion of the shovels 64 into the ground may be regulated as desired.

The frames 2 and 3 have guide members 72 and 73 carried thereby respectively, which guide members extend downwardly and rearwardly from their connections with the supporting frame, having their rear ends 74 positioned in parallel relation for passage one upon each side of a row of growing stalks, for facilitating the guiding of the travel of the tractor cultivator and also to enable the driver to maintain the spaced cultivating elements proper distances from the row.

When it is desired to use the implement as a tractor alone, and not for pulling tillage tools as indicated at 61, an auxiliary frame 75 is bolted between and to the frames 2 and 3 by means of bolts 76, as shown in Fig. 8 of the drawings, thus providing a rigid frame structure.

It will be noted, that by the provision of the super-frame or structure 4, the façing sides of which are spaced sufficiently to pass upon the sides of a row of growing corn or cotton, that the device may be employed for cultivating corn or cotton after the same reaches a considerable height, or as long as cultivation thereof is necessary and by using the cultivating element as illustrated in Figs. 1 and 2 of the drawings, two rows of corn or cotton may be cultivated after each trip across the field.

Changes in details may be made without departing from the spirit of this invention, but;

I claim:

1. In a tractor, the combination, of a pair of supporting frames, means connecting said frames, a traction wheel carried by one of said supporting frames, an auxiliary supporting frame yieldably and slidably connected to the other supporting frame, a traction wheel carried by said auxiliary sliding frame to permit movement thereof in relation to the first mentioned traction wheel, and a prime mover carried by one of said frames and operatively connected to said traction wheels.

2. In a tractor cultivator, the combination, of a pair of spaced supporting frames, a prime mover carried by one of said frames, steering means carried by said last named frame, an arched frame connecting said spaced supporting frames, and guide members carried by the forward ends of the facing sides of said supporting frames.

3. In a tractor cultivator, the combination, of a pair of spaced supporting frames, a prime mover carried by one of said frames, steering means carried by said last named frame, an arched frame connecting said spaced supporting frames, said arched frame including a super-supporting structure, traction wheels carried by said supporting frames, and power transmitting means carried by said super-structure and connecting said prime mover and said traction wheels.

4. In a tractor, the combination, of a pair of independent supporting frames, a traction wheel carried by each of said frames, a prime mover carried by one of said frames, power transmitting means connecting said prime mover to said tractor wheels, steering means for said tractor, and means connecting said steering means and said power transmitting means whereby the transmission of power to one of said wheels will be arrested upon operation of said steering means to guide the tractor toward the wheel.

5. In a tractor, the combination, of a pair of independent supporting frames, an arched frame connecting said supporting frames, an auxiliary supporting frame yieldably connected to one of said supporting frames, a traction wheel carried by said auxiliary frame, and a traction wheel rotatably carried by the other of said supporting frames.

6. In a tractor, the combination, of a pair of independent supporting frames, an arched frame connecting said supporting frames, an auxiliary supporting frame yieldably connected to one of said supporting frames, a traction wheel carried by said auxiliary frame, a traction wheel rotatably carried by the other of said supporting frames, said arched frame including a super-supporting structure, power transmitting means carried by said super-supporting structure, a prime mover carried by the second mentioned supporting frame, and power transmitting means carried by said super-structure and connecting said prime mover and said traction wheels.

7. In a tractor, the combination, of a pair of independent supporting frames, an arched frame connecting said supporting frames, an auxiliary supporting frame yieldably connected to one of said supporting frames, a traction wheel carried by said auxiliary frame, a traction wheel rotatably carried by the other of said supporting frames, said arched frame including a super-supporting structure, power transmitting means carried by said super-supporting structure, a prime mover carried by the second mentioned supporting frame, power transmitting means carried by said super-structure and connecting said prime mover and said traction wheel, and guide members carried by the forward ends of the facing sides of said spaced supporting frames.

8. In a tractor, the combination, of a pair of independent supporting frames, an arched frame connecting said supporting frames, traction wheels carried by said supporting frames, said arched frames including a super-supporting structure, power transmitting means carried by said super-supporting structure, a prime mover carried by one of said supporting frames, and power transmitting means carried by the super structure and connecting said prime mover and said traction wheels.

9. In a tractor, the combination, of a pair of spaced supporting frames, a prime mover carried by one of said frames, steering means carried by said last mentioned frames, an arched frame connecting said spaced supporting frames, an auxiliary frame slidably carried by the supporting frames other than the prime mover carrying frame, an axle carried by said auxiliary frame, a traction wheel mounted upon said axle, and a traction wheel carried by the first mentioned supporting frame.

10. In a tractor, the combination, of a pair of spaced supporting frames, a prime mover carried by one of said frames, steering means carried by said last mentioned frame, an arched frame connecting said spaced supporting frames, an auxiliary frame slidably carried by the supporting frames other than the prime mover carrying frame, an axle carried by said auxiliary frame, a traction wheel mounted upon said axle, a traction wheel carried by the first mentioned supporting frame, and yieldable means connecting said auxiliary frame to the spaced supporting frames which carries the same to permit limited sliding movement of the auxiliary frame with respect to the supporting frame and to maintain the supporting frame in a predetermined position with respect to the supporting frame.

11. In a tractor cultivator, the combination, of a pair of spaced supporting frames, a prime mover carried by one of said frames, steering means carried by said prime mover carrying frame, an arched frame connecting said spaced frames, an auxiliary frame slidably carried by the spaced supporting frames other than the prime mover carrying frame, a spring connected to the front end of said auxiliary frame and to the supporting frame which carries it, and a traction wheel supported by said auxiliary frame.

12. In a tractor cultivator, the combination, of a pair of spaced supporting frames, a prime mover carried by one of said frames, steering means carried by said prime mover carrying frame, an arched frame connecting said spaced frames, an auxiliary frame slidably carried by the spaced supporting frames other than the prime mover carrying frame, a spring connected to the front end of said auxiliary frame and to the supporting frame which carries it, a traction wheel supported by said auxiliary frame, a traction wheel carried by said first mentioned supporting frame, power transmitting means carried by said arched frame for transmitting power from said prime mover to said traction wheel.

GEORGE E. MALIN.